Jan. 22, 1952  J. HOEKSTRA  2,583,177
FLOW DIVIDING APPARATUS
Filed Oct. 26, 1944  2 SHEETS—SHEET 1
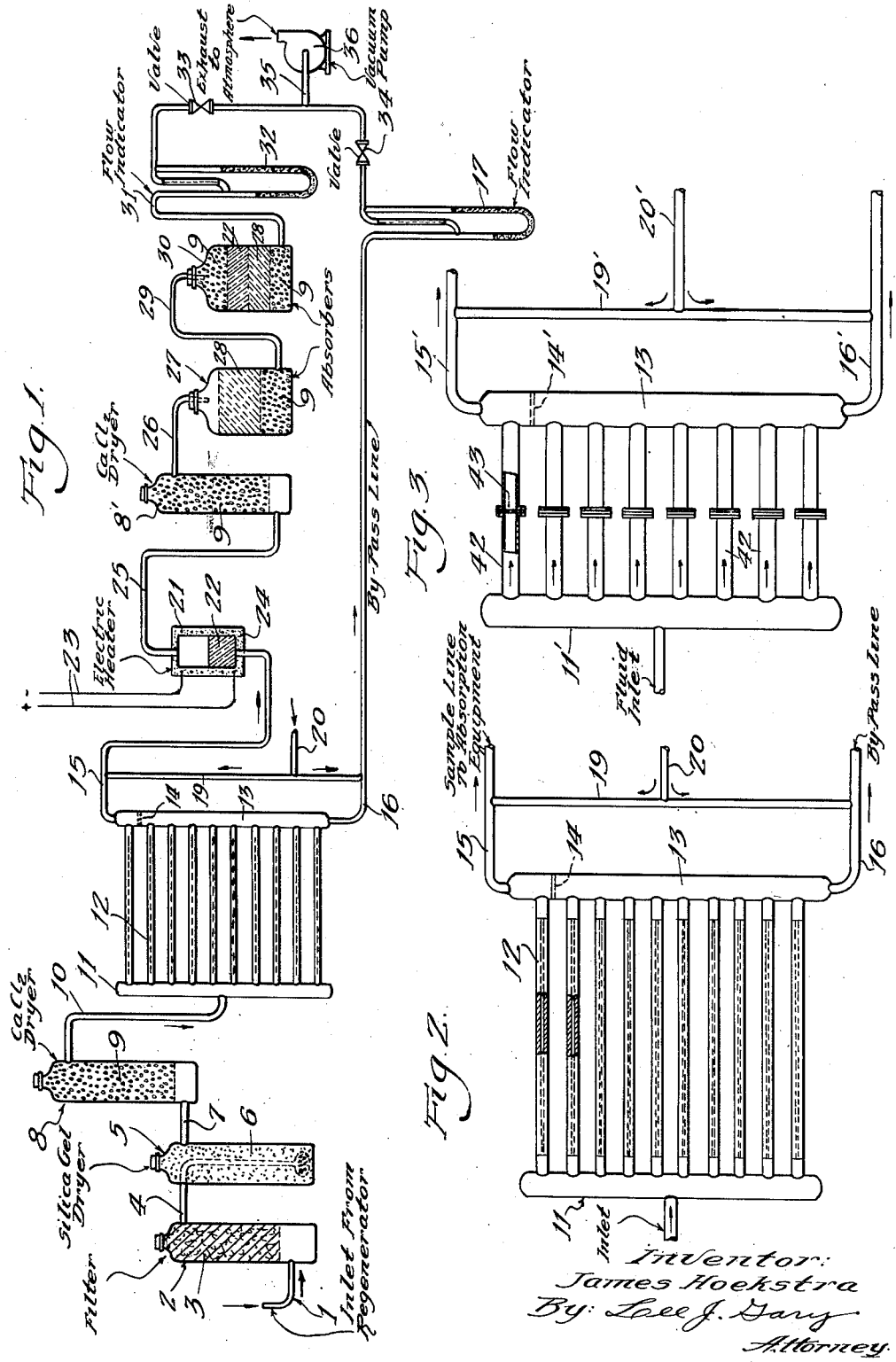

Jan. 22, 1952
J. HOEKSTRA
2,583,177
FLOW DIVIDING APPARATUS
Filed Oct. 26, 1944
2 SHEETS—SHEET 2
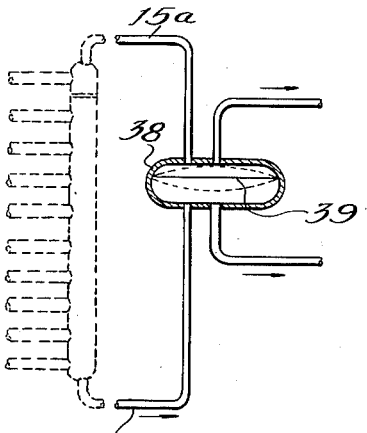
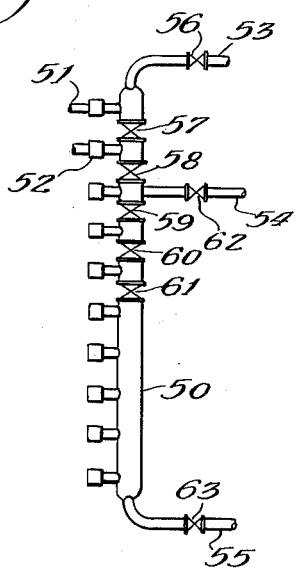
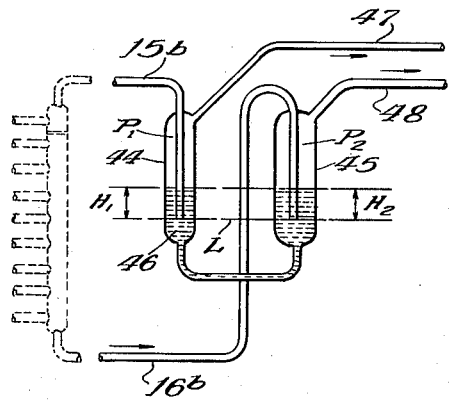
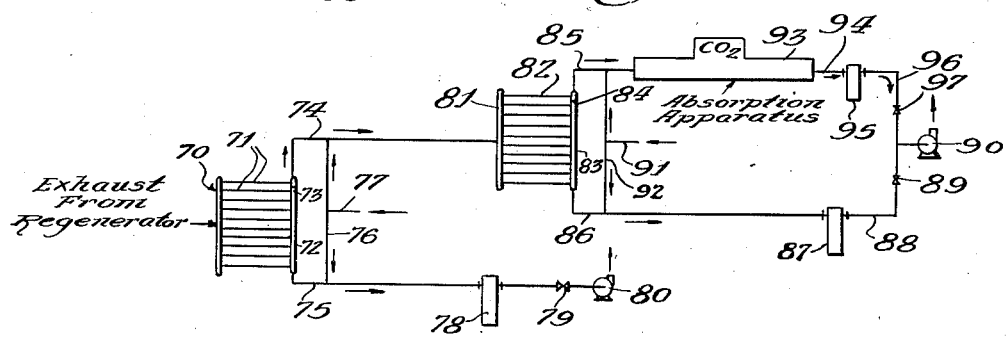
Inventor
James Hoekstra
By: Lee J. Gary
Attorney Patented Jan. 22, 1952

2,583,177

UNITED STATES PATENT OFFICE 2,583,177

FLOW DIVIDING APPARATUS

James Hoekstra, Riverside, Ill., assignor to Universal Oil Products Company, Chicago, Ill., a corporation of Delaware Application October 26, 1944, Serial No. 560,503

8 Claims. (Cl. 137—78)

1

This invention relates to an apparatus for obtaining an aliquot portion or aliquot portions of a fluid stream. It is often desirable in testing or analyzing work that there be a given ratio between the divided fluid streams.

The aliquot division of a gas or a liquid is frequently desired for analysis or test purposes where it is impractical or unwieldy to handle the entire stream. The proposed apparatus might well be used for example to determine the carbon dioxide ($CO_2$) content of a given gas stream wherein the $CO_2$ is absorbed out of the sample stream, or it might well be used in the case of liquids, in connection with an analysis wherein the desired substance is filtered out, or coagulated and precipitated out of the sample stream. The laboratory as well as the commerical uses of the proposed scheme of aliquot flow division would undoubtedly be many and varied.

Present apparatuses usually involve the measuring out of a given portion of the total flow stream, and in the case of analysis work it is necessary to calculate and convert results obtained from the sample portion to a total basis by measuring the volume of sample flow stream, as well as the volume of the total flow stream. Another apparatus in present use involves obtaining given batches of a fluid stream by timing the length of draw-off and then averaging the results obtained from a series of timed batches. Such apparatuses as these become rather involved and the chances for inaccuracies become greater.

The proposed flow-divider in its simplest form may consist of a plurality of capillary tubes, each connected to a common inlet header or manifold to distribute the incoming fluid stream to each tube. With a large pressure drop taking place in each of the capillary tubes, a substantially uniform distribution takes place from the header to the tubes. The outlet manifold may be divided into two sections and any desired flow ratio may be obtained by connecting the appropriate number of tubes to each section of the divided outlet manifold, or alternately the position of the seal in a single outlet header may be placed to divide the flow and thus obtain a desired flow ratio. In order that the flow through the capillary tubes be proper and for the flow-

2 divider to function in the right manner it is essential that the pressure be equal at the outlets from each section of the outlet manifold. One apparatus for accomplishing this may involve connecting the two outlets to a medium which will be common to the said outlets and which will serve to equalize the pressure at these outlets. To prevent mixing of the divided fluid streams through the common pressure equalizing tube, it is necessary to have means for maintaining higher flow rates through each of the discharge lines than there is through the corresponding outlets from each section of manifold. By so doing, air (or whatever inactive fluid medium is used) will be continually drawn through the pressure equalizing tubes and into both of the discharge lines to be commingled with the divided flow streams.

Another means for equalizing the pressures in the outlet conduits makes use of a pressure equalizing diaphragm. The two conduits are led through a small chamber wherein a flexible diaphragm is used to separate the two compartments. Thus, if the pressure is greater on one side of the diaphragm in the chamber from one conduit than on the other side of the diaphragm from the other conduit, then the deflection of the diaphragm will act to restrict the flow on the side of the least pressure and thus restore equilibrium of pressures.

Still another means for equalizing outlet pressures may employ the use of a pressure equalizing U-tube arrangement, wherein the fluid from each outlet conduit will be discharged into and be withdrawn from the separate legs of a closed U-tube. This method will be more fully explained later in the specification with reference made to a drawing showing this particular modification.

Another embodiment of the flow divider may comprise a plurality of small orifice plates placed in tubes and installed in parallel (in the same manner as the previously mentioned capillary tubes) between an inlet distributing header which is common to each, and an outlet collecting header or manifold which is divided to suit the desired flow ratio. This desired flow division may be obtained by connecting the appropriate number of orificed tubes to each section of the divided outlet manifold. Also as before mentioned in connection with the capillary tubes, it is essential that the pressure be equal at the outlets from each section of the outlet manifold, so that the means for equalizing the pressure must be provided as well as means to maintain proper flow through the discharge lines.

The maintenance of the flow rate, through each flow branch, where the inlet pressure is not great enough to sustain proper flow, may be easily accomplished by the use of a vacuum or suction pump placed at the discharge end, while a needle valve placed in each branch before connecting to the pump can control the flow rate through each branch.

It is not intended to limit this invention to any set number of capillary tubes, (or orifices), or to any set ratio of flow division. It is further contemplated that there might well be more than two divisions of the incoming fluid stream by having three or more outlet manifolds. The discharge tubes from each of the manifolds should be connected as before mentioned to some means for equalizing pressure therefrom.

An elaboration of the dividing device coming within the concepts of this invention is to make the outlet manifold adjustable by placing valves at various positions on the manifold body itself thereby to provide many possible selections in dividing the flow to obtain aliquot portions.

In still another variation of the device, the capillary tubes or orifices may be installed in such a manner as to allow them to be replaced. Thus, for any given apparatus, sets of capillary tubes or orifices of different size can be used to suit varying flow conditions.

Any given set of capillary tubes should be quite uniform and therefore should be individually calibrated by selecting equal bore-sizes on the basis of pressure versus the flow rate when connected to a short piece of standard tubing. On the same basis, since equality of resistance to flow through each tube is necessary to obtain aliquot flow division, the selection of orifices should be such that they are as nearly equal as possible.

The construction of simplified forms of the apparatus involved will be more apparent with reference to the accompanying diagrammatic drawings and the following description thereof.

Figure 1 is a diagrammatic illustration of an apparatus used for obtaining an aliquot part of a total fluid gas stream and for analyzing the aliquot part.

Figure 2 is an elevational view of a simplified form of the device of this invention making use of a plurality of capillary tubes, for aliquotly dividing a fluid stream.

Figure 3 is an elevational view of an alternate form of the device making use of a plurality of orifice plates for aliquotly dividing a fluid stream.

Figure 4 is an elevational view of an alternate form of the pressure equalizing portion of the device employing a flexible diaphragm in a small closed pressure equalizing chamber.

Figure 5 is an elevational view of another alternate form of the pressure equalizing portion of the device, providing equalizing tubes partially filled with liquid and interconnected by a U-tube in a manner to exert equal pressures on the discharge conduits.

Figure 6 illustrates a further modification of the invention and shows how the outlet manifold may be elaborated on in a manner such that it may be made adjustable for use in obtaining different aliquot sampling ratios.

Figure 7 shows how two stages of flow division can be employed where the total quantity of the fluid is large and only a small sample stream can be handled. This method also would eliminate the necessity of a large number of tubes in getting small flow ratios.

As previously indicated the flow dividing apparatus may be used for sampling many different kinds of fluid streams. However, to be as specific as possible, but with no intention of limiting the invention, the description which follows is addressed to a method for sampling exhaust gas from a catalyst regenerator and to the method of analyzing such gas.

Referring now to Figure 1, the exhaust gas to be analyzed is brought to the equipment through conduit 1 then through filter 2 containing glass-wool 3 as a filtering medium for removing any entrained solid or liquid particles. The gas passes from filter 2 through conduit 4 to a dryer 5 which may comprise a container filled with silica gel 6 for removing excess moisture. To complete the drying of the gas it is passed from the silica gel dryer through line 7 to a second dryer 8 which is a container filled with calcium chloride 9. From the $CaCl_2$ dryer 8 the gas flows through conduit 10 to the flow dividing apparatus. The latter in this case comprises an inlet manifold 11, a plurality of capillary tubes 12 each connected at one end to manifold 11 and at the other end to a divided outlet manifold 13, which is divided by means of a seal or some type of closure 14, thereby providing separate gathering means for the fluid discharge from the flow-divider. The sample or smaller portion then passes through conduit 15 for further treatment while the larger or rejected portion passes through conduit 16 directly through a flow indicator 17 to the vacuum pump 36. The flow-divider shown in the diagram and used in this illustrative case has 10 capillary tubes with the dividing seal placed in the outlet manifold so that material through only one tube, or a $\frac{1}{10}$ part of the gas stream, is going to the absorption equipment while $\frac{9}{10}$ of the stream is being by-passed directly to the vacuum pump and discharged to the atmosphere.

In order to have proper functioning of the flow-divider, there must be equal pressure at the two outlets and this is accomplished by means of the common tube 19 which also has an air intake through conduit 20. To prevent any mixing of the gas streams in conduits 15 and 16, higher flow rates are maintained in the lines leading to the absorber and the exhaust line, than in the same corresponding lines at the outlets of the flow-divider; thus, air is continually drawn into both lines through the air inlet conduits 20 and 19. The air thus drawn into the sample gas stream (in conduit 15) provides oxygen for the oxidation of any carbon monoxide (CO). The air thus drawn in should be free of any hydrocarbon or $CO_2$ vapors, because either would cause an error in the results of the test. However, the amount of $CO_2$ in clean air can be disregarded as negligible. The sample of exhaust gas in conduit 15 together with air from conduit 19 passes to a carbon monoxide burner. This CO burner is made up of a small chamber 21 which has a small amount of "Hopcalite" catalyst 22 within. An electric resistance heating element 23 is provided to maintain the temperature at 250° to 350° C. for efficient operation of the "Hopcalite" catalyst (Hopcalite is a low temperature CO oxidation catalyst supplied by the Mine Safety Appliance Company, which deactivated rapidly at room temperature, but a single charge continued to operate for several months at the above temperature). An outer insulation jacket 24 is provided to help in maintaining the temperature.

The gases from the CO burner pass through conduit or tube 25 to another $CaCl_2$ dryer which is marked 8'. After leaving the CO burner and the dryer the gases are ready to pass through tube 26 to the first or main absorber 27. This first absorber has the upper space filled with Ascarite 28, (Ascarite is a well known sodium hydroxide-asbestos absorbent for $CO_2$), a thinner layer of $CaCl_2$ 9 is placed at the bottom of this absorber. From the main absorber 27, the gases pass through tube 29 to the second absorber 30 which is a "clean-up" absorber in case any CO escaped oxidation in the CO burner or any $CO_2$ escaped absorption in the first absorber. This second absorber 30 has four equal layers of material within, a layer of $CaCl_2$ 9, a layer of Hopcalite 22, a layer of Ascarite 28, and a layer of $CaCl_2$ 9.

The remaining exhaust gases and air pass from the second absorber 30 on through conduit 31, and through flow indicator 32, which is shown as a U-tube filled with mercury. A wet test meter or any type of gas measuring device may be used, however, the type indicated is satisfactory if the capillary has been selected to cover the range of flow desired and the U-tube has been properly calibrated. The flow rate through the absorption apparatus is controlled by the needle valve 33, while the flow rate through the by-pass line is controlled by the needle valve 34 and indicated by the indicator 17. The two flow branches converge again into one conduit 35, which is the suction line to the vacuum pump 36. The vacuum pump then discharges the gases to the atmosphere. The gain in weight of the $CO_2$ absorbers 27 and 30 multiplied by the calibration factor of the flow-divider (which in the case illustrated was 16), gives the $CO_2$ eequivalent of the carbon in the exhaust gas which was removed by oxidation in the regenerator.

Figure 2 shows an enlarged view of the flow-divider used in the illustrative case described above. The numbers of the various parts in Figure 2 are therefore, the same as used in Figure 1. The capillary tubes 12 are shown in such a manner as to indicate that they are sealed to the stub end on the inlet manifold 11 and outlet manifold 13, however, as before stated the capillary tubes 12 could be connected by means of a tight coupling if it is desirable to have them replaceable. The dividing seal 14 in the outlet manifold 13 is of course placed to suit the ratio of flow division that is desired. However, it is not the intention to limit the device to any set number of tubes or set ratio of aliquot flow division.

Figure 3 shows an alternate form of the flow dividing device wherein orifice plates are substituted for the capillary tubes, the basic principle, of obtaining equal flow resistance through each tube, remaining unchanged. This device comprises an inlet header or manifold 11' which distributes the fluid from the inlet line to each tube 42 and through each orifice 43. The number of tubes 42 and orifices 43 used is optional depending on the flow ratio desired from the outlet manifold 13'. The outlet manifold is divided by a sealing member 14' which is placed to suit the flow ratio desired. As shown in the drawing, the upper conduit 15' would receive the small aliquot portion of the flow since it is fed by only one orifice 43, while conduit 16' would have the large aliquot part of the flow, since it would receive fluid from all of the remaining orifices 43. For proper operation and aliquot dividing the two outlets 15' and 16' must be discharging at an equal pressure. Therefore from another source fluid is drawn in through tube 20' which flows into tube 19'. Tube 19' being common to both outlets of the manifold from the flow-divider will allow the pressure to equalize itself between the two points.

Figure 4 shows discharge lines 15a and 16a from the outlet manifold of a flow-divider such as in Figure 2 or 3. These lines lead to a pressure equalizer 38 which is a small chamber having flexible diaphragm 39 separating the two portions of the chamber. The diaphragm will in operation deflect away from the side having the greater pressure thus restricting the flow through the opposite outlet. The deflection of the diaphragm is indicated by dotted lines and it may be to either side. The restriction of flow to one of the outlets brings about the increase of pressure on that side and a restoration of pressure equilibrium in the two discharge lines 15a and 16a.

Figure 5 shows still another alternate method of pressure equalizing for discharge lines from the outlet manifold of a flow-divider such as illustrated in Figures 2 and 3. The discharge lines are marked 15b and 16b, with 15b leading into and submerged below the liquid level in one leg 44 of a closed U-tube and 16b leading into the other leg 45 of the U-tube. The two lines leading into the two separate legs of the U-tube should end at the same level L, and the liquid 46 within the tubes should be non-miscible with and heavier than the fluid that is flowing through the apparatus. The height of liquid 46 above the conduit discharge in leg 44 is marked $H_1$ and the pressure above the liquid level in the discharge line 47 noted as $P_1$. Similarly, the height of liquid in leg 45 above level L will be $H_2$ and the pressure in the discharge line 48 is $P_2$.

The pressure on the discharge conduit 15b from the collecting manifold will be the liquid pressure $H_1$, plus the pressure $P_1$ above the liquid, and the pressure on the discharge conduit 16b will be the liquid pressure $H_2$ plus the pressure $P_2$ above the liquid. Since the liquid columns in the two legs 44 and 45 of the U-tube are interconnected then the difference in height is always equal to the difference between the overhead pressures, which may be expressed mathematically as:

$$H_1 - H_2 = P_2 - P_1$$

or $$H_1 + P_1 = H_2 + P_2$$

Thus, this manner of discharge results in pressure equalizing the fluid flow through the two outlet conduits 15b and 16b.

Figure 6 shows a more elaborate adjustable outlet manifold which may be used on the flow-divider. The outlet manifold 50 as shown has ten capillary tubes 51 connected to it by means of couplings 52. Three outlet branches from the manifold 50 are shown and are given the numbers 53, 54 and 55. By proper manipulation of valves 56, 57, 58, 59, 60, 61, 62 and 63 quite a selection of flow ratios is available. For example, by opening valves 56, 57, 59, 60, 61 and 63, while keeping closed valves 58 and 62, then a $\frac{7}{10}$ portion of the flow stream will be obtained through the conduit 53, while a 1/10 portion will be obtained through outlet 55. To give another example, by having open valves 56, 58, 60, 61, 62 and 63, while keeping closed valves 57 and 59, then the flow division will be such that a 7/10 portion is obtained through outlet 53, a 2/10 portion through outlet 54, and a 1/10 portion obtained through outlet 55.

It will be obvious to anyone familiar with piping and by-passing arrangements that there are many flow combinations that have not been mentioned, and that can be obtained by proper manipulation of the valves on the outlet manifold, in connection with the proposed method of aliquot flow division.

Figure 7 shows an apparatus for two-stage flow division which is advantageous where the total quantity of fluid is large and a very small part only is required or needed. For purposes of illustration it will be assumed in this diagram that the amount of $CO_2$ in the exhaust gas from a regenerator is to be determined. The total gas stream is fed to the inlet manifold 70 of the first flow-divider wherein the stream is distributed through each restricting tube 71 to the outlet manifold 72 which is divided into two sections by means of seal 73 so that only fluid from one of the tubes 71 is allowed to flow to the conduit 74, while the gas from the rest of the tubes 71 flows into the large section of the collecting manifold 72 and from there passes to conduit 75. The pressure is equalized in the two conduits 74 and 75 by means of the interconnecting tube 76 and air is drawn into the tube 77 which connects to tube 76 and which, in turn, distributes air to each of the flow branches 74 and 75. The large aliquot stream of gas in conduit 75 is drawn through a flow meter or indicator 78 and through needle valve 79, which is necessary to control the flow, and then is exhausted to the air by the vacuum pump 80. The small aliquot gas stream in conduit 74 is pulled to the inlet manifold 81 of the second stage flow-divider. As through the first divider the gas stream is again split by means of tubes 82, outlet manifold 83, and sealing member 84, so that the small part of the flow is carried to the $CO_2$ absorption equipment through conduit 85. The large part of the gas stream from this second stage flow-divider is by-passed through conduit 86 to flow meter 87, through conduit 88 and needle valve 89, and is then exhausted by the vacuum pump 90. As in the first stage of flow division, air will be drawn in through tube 91 and distributed by tube 92 to each flow branch. This tube 92 also serves as a means for equalizing the pressure between the flow branches 85 and 86. The $CO_2$ absorption apparatus 93 will not be described in detail here, but can be similar to that used in Figure 1, where it was described in detail. The flow from this absorption apparatus 93 will be through conduit 94 to flow meter 95, which is needed to check flow rates, and through conduit 96 and needle valve 97 and then is exhausted by the vacuum pump 90. The needle valves 89, 97 and 79 are the flow controlling means and therefore must be adjusted carefully to obtain proper flow rates in all of the flow branches. In the Figure 7, if, for example, ten capillary tubes 71 are used in the first flow-divider and ten tubes 82 are used in the second flow-divider, then with seals 73 and 84 placed as indicated a 1/100 aliquot part of the entering fluid stream would be passed to the $CO_2$ absorption equipment.

Although the above description covers two stages of flow division, it is not intended to limit this type of division to only two stages since the use of several stages of flow-dividers is quite feasible. Also, other alternate methods may be used, as have previously been described, for equalizing the pressures in the discharge lines from the collecting manifolds, and the use of vacuum pumps is of course unnecessary where the inlet pressure is large enough to sustain flow.

I claim as my invention:

1. An apparatus for dividing a fluid stream into aliquot parts comprising a plurality of capillary tubes, having equal flow resistance, each connected to and communicating with an inlet header conduit and an outlet header conduit, said outlet header conduit being divided into at least two compartments and each compartment being arranged to serve as a gathering zone for aliquot portions of said fluid, an outlet communicating with each of said compartments for withdrawing fluid therefrom, a pressure equalizing conduit communicating with each of said outlets and means for admitting a pressure equalizing fluid to the last named conduit to prevent mixing of the fluid portions discharging from said outlets.

2. An apparatus for dividing a fluid stream into aliquot parts comprising a plurality of conduits having approximately equal flow resistances, a fluid inlet manifold connected to each of said conduits, a sampling outlet from at least one of said conduits, an independent outlet connected to the remainder of said conduits, a pressure equalizing conduit connecting said outlets, and an inlet for introducing a pressure equalizing fluid to the last-named conduit to prevent mixing of the fluid portions discharging from said outlets.

3. In an apparatus of the class described comprising at least two conduits and means for passing a fluid therethrough, the combination of an outlet communicating with one of said conduits, an independent outlet communicating with another of said conduits, a pressure equalizing conduit connecting said outlets, and an inlet for introducing a pressure equalizing fluid to the last-named conduit to prevent mixing of the fluid portions discharging from said outlets.

4. An apparatus for dividing a fluid stream into aliquot parts comprising a plurality of conduits having approximately equal flow resistances, a fluid inlet manifold connected to each of said conduits, a sampling outlet from at least one of said conduits, an independent outlet connected to the remainder of said conduits, and a pressure equalizer connected to said outlets and comprising means for preventing mixing of the fluid portions discharging from said outlets in order to maintain accurate proportions of fluid in the outlets.

5. An apparatus as defined in claim 4 further characterized in that said pressure equalizer comprises a chamber having a flexible diaphragm extending across the interior thereof, said outlets being connected to the chamber on opposite sides of said diaphragm.

6. An apparatus as defined in claim 4 further characterized in that said pressure equalizer comprises a pair of chambers joined through a U-tube and containing a liquid immiscible with said fluid stream, one of said outlets being connected to one of said chambers and the other outlet to the other chamber at a uniform level below the surface of the liquid in the chamber.

7. The apparatus of claim 4 further characterized in that said conduits are capillary tubes.

8. The apparatus of claim 4 further characterized in that said conduits contain orifice plates to provide said flow resistances in the conduits.

JAMES HOEKSTRA.

REFERENCES CITED

The following references are of record in the file of this patent:

UNITED STATES PATENTS

| Number | Name | Date |
|---|---|---|
| 1,112,432 | Brach | Oct. 6, 1914 |
| 1,318,676 | Lawrence | Oct. 14, 1919 |
| 1,340,838 | Rohde | May 18, 1920 |
| 1,382,072 | Finkl | June 21, 1921 |
| 1,688,839 | Tears | Oct. 23, 1928 |
| 1,999,834 | Ernst | Apr. 30, 1935 |
| 2,037,994 | Neubauer | Apr. 21, 1936 |
| 2,242,002 | Klein | May 13, 1941 |
| 2,309,625 | Cantrell | Feb. 2, 1943 |

FOREIGN PATENTS

| Number | Country | Date |
|---|---|---|
| 162,249 | Great Britain | Oct. 19, 1922 |
| 171,739 | Great Britain | Nov. 21, 1921 |
| 526,869 | Germany | of 1931 |